United States Patent Office 2,778,255
Patented Jan. 22, 1957

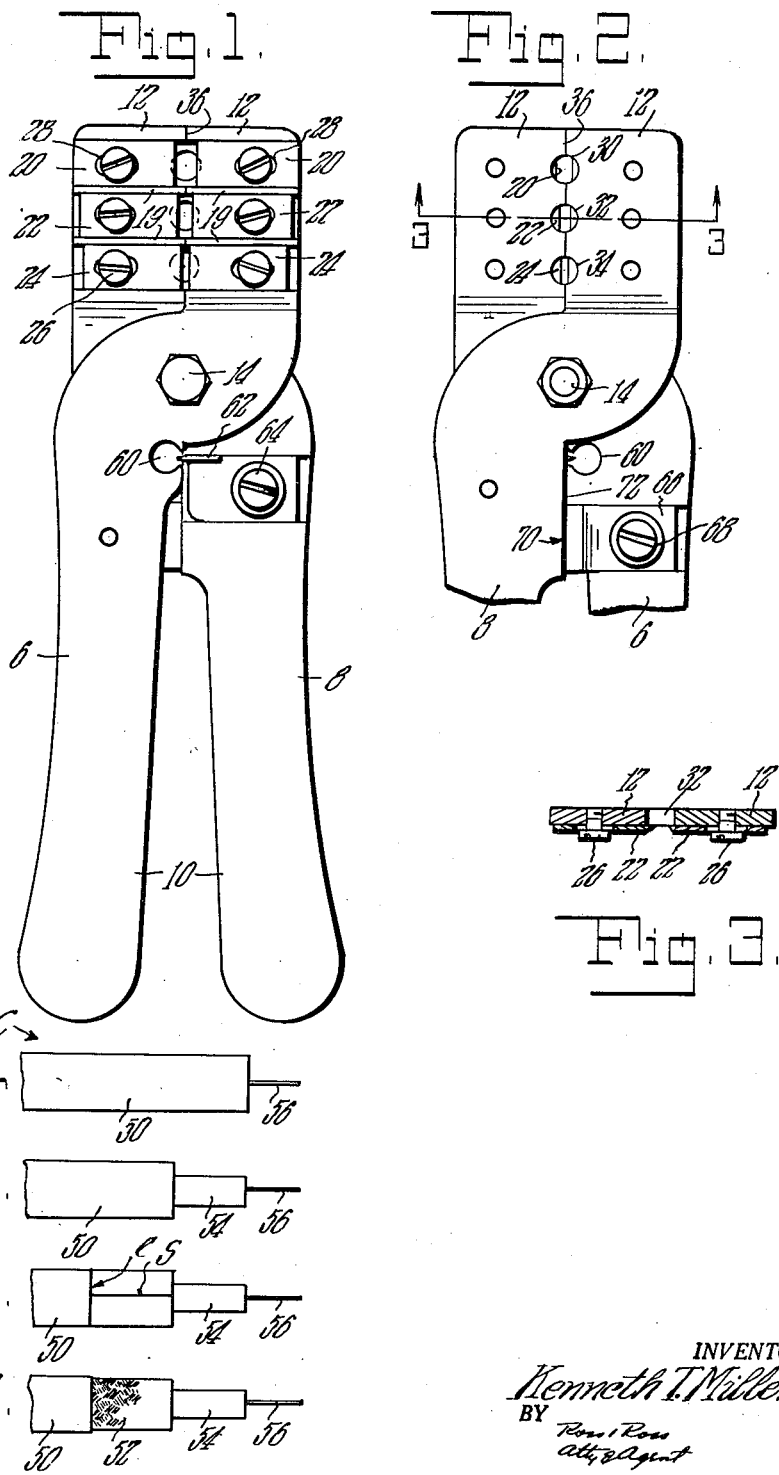

2,778,255

CUTTING TOOL FOR COAXIAL CABLES

Kenneth T. Miller, Longmeadow, Mass.

Application March 16, 1955, Serial No. 494,768

1 Claim. (Cl. 81—9.5)

This invention relates to new and useful improvements in tools for dressing the ends of coaxial cable and is directed more particularly to tools for guiding the ends of a cable and successively stripping the components thereof in order to dress the same preparatory to connecting coaxial fittings and the like.

It is another object of the invention to provide a tool for working on electric cables which is further characterized by means for splitting the sheath of a plural conductor cable and stripping insulation from the conductors thereof.

It is still a further object to provide a tool which is adapted for severing the outer sheath or covering of a plural conductor cable and which includes means for stripping the insulation from the conductors.

Other prime objects of my invention include: first, the securement of a higher degree of accuracy and greater degree of variety in the manner of work performed therewith than has heretofore been possible with prior devices known in the art; second, the attainment of a higher speed of construction and assembly of the device due to its simplification of design and its unique composition of parts; third, the attainment of a flexibility or a capability of adjustment by which a large variety of work can be produced by means of the same device; fourth, the achievement of a greater ease in adjustment and repairs; fifth, the provision of an improved dressing tool which may be made more economically and with fewer operations in the manufacture of its parts, as well as in the assembly of the same, than prior devices known in the art; sixth, the provision of a construction which may be readily installed with respect to the various purposes for which it is intended, and seventh, the provision of such other improvements in and relating to dressing tools of the type above referred to as are hereinafter described and claimed.

Further objects and advantages of my invention will become apparent as the following description proceeds, and the features of novelty which characterize my invention will be pointed out with particularity in the claim annexed to and forming part of this specification.

In the accompanying drawing, I have illustrated a complete example of a physical embodiment of the invention in which the parts are combined and arranged in accordance with one mode which I have devised for the practical application of the principles of the invention.

It will however be understood that changes and alterations are contemplated and may be made in these exemplifying drawings and mechanical structures, within the scope of the claim, without departing from the principles of the invention.

All of the above objects, I accomplish by means of a structure and arrangements of parts which is to fully appear in the description below and in other specific features which are to be hereinafter set forth. To these and other ends as will become more readily apparent as the description proceeds, this invention consists in certain novel features of construction and in the combination and arrangement of parts to be hereinafter pointed out in the claim hereunto annexed and to be described and referred to in connection with the accompanying drawings wherein:

Figs. 1 and 2 are front and rear side elevational views respectively of a tool embodying the novel features of the invention;

Fig. 3 is a sectional view of the tool on the line 3—3 of Fig. 2; and

Figs. 4, 5, 6 and 7 are plan views of an end portion of coaxial cable to explain the operation of the tool.

In the above mentioned drawing annexed hereto and forming a part of this specification, I have presented but one embodiment of my invention which is deemed preferable, but is for purposes of illustration only. It is to be understood that the invention is susceptable of incorporation in other modified forms coming equally within the scope of the claim hereof and that changes may be made in various respects and within the scope of the appended claim without departing from the broad aspects and spirit of the invention.

In the several figures of the drawing, wherein like reference numerals indicate like parts, a pair of elongated operating members 6 and 8 having lower handle portions 10 and upper jaw portions 12, and are hinged at 14 for relative inward and outward swinging movements of the jaw portions. The jaw portions of the operating members are on the corresponding ends.

Each jaw portion 12 carries a plurality of cooperating blades 20, 22 and 24, which blades have sharpened inner cutting ends or edges. Each blade is secured to the upper side of its respective jaw portion by means of an adjusting screw 26 which extends through an elongated slot 28 whereby the in and out adjustment of the blade relative to its respective jaw portion is facilitated.

The jaw portions may, if desired, be provided with guideways formed by shoulders 19 between the blades 20, 22 and 24 and so aid in retaining the blades in the desired position relative to the respective jaw portion.

The blades carried by the jaw portions are arranged to constitute pairs thereof and are adjustable as to each other to provide different spacing of the inner cutting edges of the pairs thereof.

The handle portions are in superposed relation as to each other and are thereby held in adjacent planes.

The jaw portions are each offset with respect to their respective handle portions so that they are disposed in in the same plane when in operative relationship as shown. If desired, only one of the jaw portions need be offset relative to its handle portions, all as is well known, an important feature being that the members 6 and 8 are pivoted for swinging on a certain axis.

Each of the inner abutting edges of the opposed jaw portions are provided with a plurality of spaced half round cut outs in longitudinally spaced relation which are oppositely spaced in a cooperative manner so as to provide openings or guideways 30, 32 and 34 of like diameter which may be chamfered at their outer ends. These are adapted to receive a coaxial cable. The guideways are in alignment with the blades when the handles are in the closed position as shown in Figs. 1 and/or 2.

Adjacent and intermediate the openings 30, 32 and 34, inner edge portions 36 of the opposed jaw portions 12 and 12 are arranged to abut each other as best shown in Fig. 2 and serve to limit the inner relative positions of the jaw portions toward each other all to the end that the innermost portions of the cutting edges of the blades are likewise in their movements toward each other.

As aforesaid, the blades are adjustable toward and away from each other and are set so as to cut through the coaxial cable to different depths thereof as hereinafter explained.

A coaxial cable C of the usual type includes an outer covering 50, an outer braided conductor 52 inside of the outer covering, insulation 54 within the conductor, and a center conductor 56 within the insulation. The center conductor may consist of a single wire or a plurality of wires.

The tool may be used in several ways but operates efficiently by opening the handles whereupon the cable C is inserted into the guideway 30. The blades 20 and 20 set so as to cut through the cable to the center conductor. The cable and tool are rotated relatively so as to cut the entire circumference of the cable and the cable is thereupon pulled away from the tool so as to strip the cable down to the conductor 56.

The cable is then inserted in guideway 32 and the blades 22 and 22 are set so as to cut through the outer covering and braided conductor whereupon the tool and cable are again relatively rotated so as to complete this cutting operation. When the cable and tool are pulled relative to each other, the outer covering and braided conductor are separated from the insulation 54.

As a third step, the cable is inserted in guideway 34. The blades 24 and 24 are set so as to cut through the outer covering by the relative rotation of the cable and tool as at c.

The end portion of the covering from the cut c is slit at S by being inserted in a guideway 60 adjacent an inner edge of handle portion 6.

The axis of the guideway is parallel to said certain axis of the pivot means 14.

The guideway is provided with a lateral opening adjacent the inner edge of the other handle portion 8.

When the cable is inserted into the guideway and drawn therein, it is moved relative to a slitter 62 secured in adjustable position to the handle portion 8 by a screw 64.

Cut off means includes a stripping blade 66 adjustably secured to handle portion 6 by a screw 68 and having an inner cutting edge 70 for abutting an edge portion 72 of handle portion 8 and for engaging a cable therebetween for cutting purposes.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the claim below.

What it is desired to claim and secure by Letters Patent of the United States is:

A tool for dressing the end portion of coaxial cable to expose the center conductor and insulation therearound and the outer braided conductor comprising in combination, a pair of separate elongated members formed from strip steel of greater transverse width than thickness to have elongated lower handle and intermediate portions in horizontal superposed relation and elongated upper jaw portions, said intermediate portions being pivotally connected for swinging of said handle portions in horizontal planes between open and closed positions of the jaw portions, said jaw portions being offset in horizontal planes relative to their respective handle portions and offset vertically to lie in the same horizontal plane and provide a pair of cooperating jaws having inner adjacent edges for abutment in closed position thereof, said jaws having upper and lower faces and said upper faces provided with transverse knife grooves with the groove of one jaw member in alignment with the groove of the other jaw member, elongated knives in said grooves provided with elongated slots and having cooperating sharp inner end edges, clamp screws threaded in said jaws and extending through said slots for adjustment of said knives in said grooves, and adjacent inner edges of said jaws provided with half-round cooperating cutouts below inner edges of the knives forming a round guideway for cable disposed below inner edges of aligned knives of said jaws.

References Cited in the file of this patent

UNITED STATES PATENTS

| | | |
|---|---|---|
| 1,388,398 | Adams | Aug. 23, 1921 |
| 1,924,837 | Crause | Aug. 29, 1933 |
| 2,054,973 | Ferguson | Sept. 22, 1936 |
| 2,400,177 | Tomsick | May 14, 1946 |
| 2,668,464 | Paules | Feb. 9, 1954 |
| 2,704,000 | Miller | Mar. 15, 1955 |